No. 810,862. PATENTED JAN. 23, 1906.
W. J. HOFSTATTER.
SAFETY COUPLING SECTION FOR AIR BRAKE PIPES.
APPLICATION FILED AUG. 19, 1904.
2 SHEETS—SHEET 1.
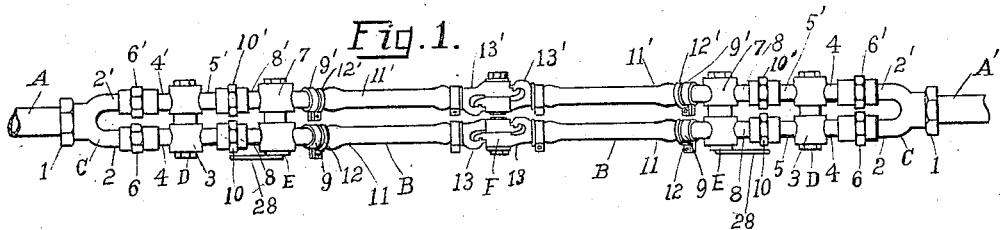
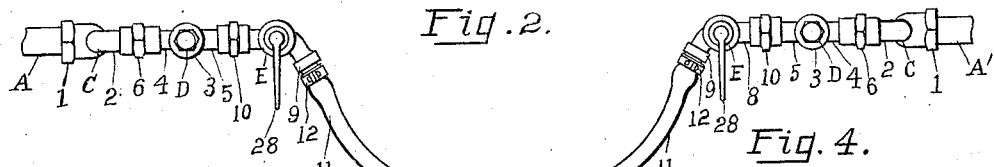
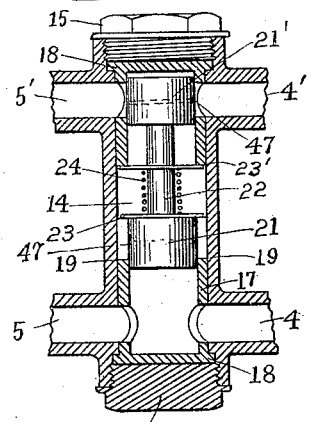
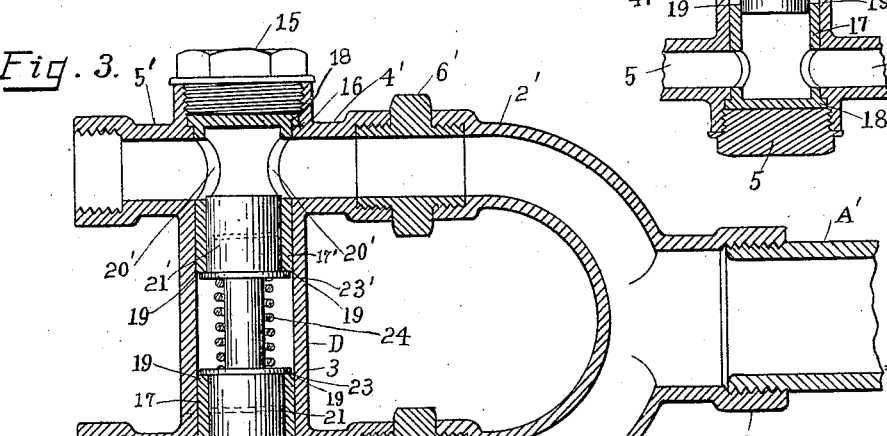
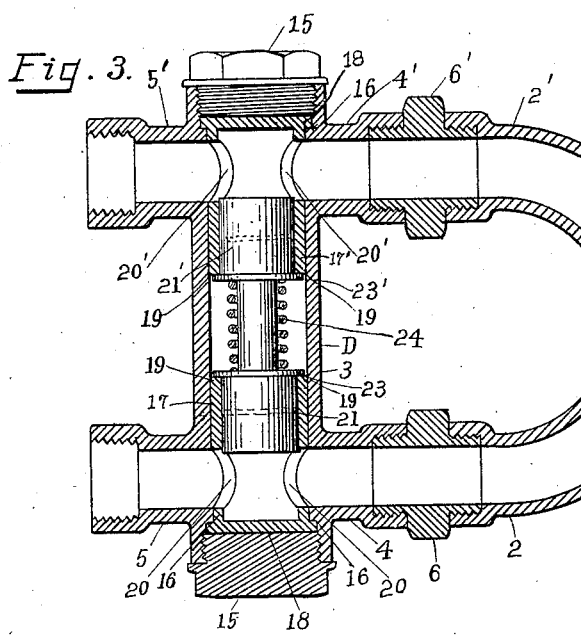
WITNESSES:
O. A. D. Young.
Chas. A. Boake.
INVENTOR.
William J. Hofstatter
By Robt. B. Wilson
Attorney No. 810,862. PATENTED JAN. 23, 1906.
W. J. HOFSTATTER.
SAFETY COUPLING SECTION FOR AIR BRAKE PIPES.
APPLICATION FILED AUG. 19, 1904.
2 SHEETS—SHEET 2.
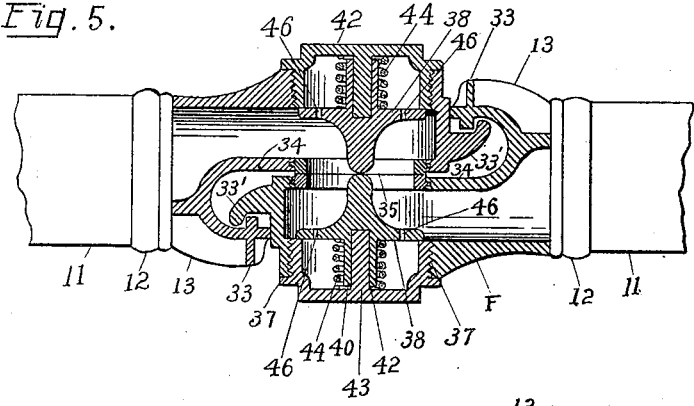
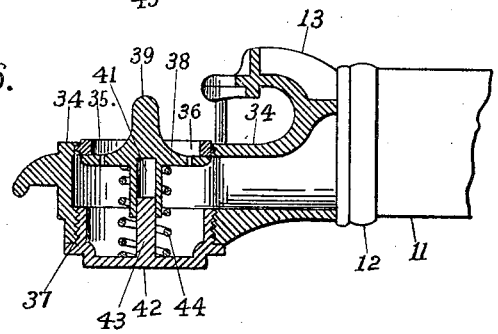
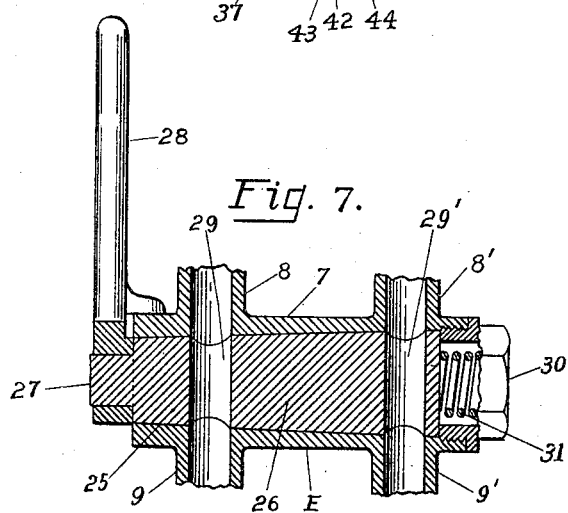
WITNESSES:
INVENTOR.
William J. Hofstatter
By Robt B Wilson
Att'y

UNITED STATES PATENT OFFICE.

WILLIAM J. HOFSTATTER, OF TOLEDO, OHIO.

SAFETY COUPLING-SECTION FOR AIR-BRAKE PIPES.

No. 810,862.     Specification of Letters Patent.     Patented Jan. 23, 1906.

Application filed August 19, 1904. Serial No. 221,370.

*To all whom it may concern:*

Be it known that I, WILLIAM J. HOFSTATTER, a citizen of the United States, residing at Toledo, Lucas county, Ohio, have invented a new and useful Improvement in Safety Coupling-Sections for Air-Brake Pipes, of which the following is a specification.

My invention relates to a safety coupling-section for air-brake pipes, and has for its object to provide a two-way coupling-section of the kind that forms two unobstructed conduits for the passage of air between the car-sections of a train air-pipe, each continuous therewith and having means which in the event of the accidental bursting of either one of the conduits will automatically close the connections of such conduit with the main air-pipe, prevent any reduction of pressure in the main air-pipe equivalent to an emergency reduction by the engineer's valve, and leave the other conduit and the train-pipe intact and unobstructed for the free passage of air and in condition for effecting all the operations of the air-brake system.

A further object is to provide a two-way coupling-section of the kind comprising two equal two-way tubular sections each having couplers complementary to the other adapted to join the two sections and form two unobstructed conduits each continuous with the car-sections of the main air-pipe, each provided with means which will in the event of the couplers becoming uncoupled automatically close the separated couplers and prevent any reduction of pressure that is equivalent to an emergency reduction by the engineer's valve.

A further object is to provide a coupling-section of the kind described with means which in the event of the bursting of one of the two conduits of the section or of the uncoupling of the couplers of the section will produce a gradual reduction of the pressure in the train air-pipe equivalent to an ordinary service reduction by the engineer's valve and so operate the brakes as to bring the train or separated parts of the train to a gradual stop, and thereby prevent the disastrous wrecks that frequently occur from one or the other, or both, of the causes stated.

I accomplish these objects by substituting for the coupling-sections commonly used for extending the main train-pipe from car to car a two-way coupling-section constructed, arranged, and equipped substantially as hereinafter described, and illustrated in the drawings, in which—

Figure 1 is a top view of my invention in position coupling end portions of two adjacent car-sections of a train air-pipe with the handles of the angle-cocks shown in "open" position. Fig. 2 is a side view of the same with the handles of the angle-cocks shown in "closed" position. Fig. 3 is a horizontal longitudinal section through a two-way closure-valve in its normal open position. Fig. 4 is a similar view with the valve in one of its closed positions. Fig. 5 is a horizontal section through the coupled couplers of one branch of a two-way coupling-section, showing the open position of the closure-valves when the couplers are coupled. Fig. 6 is a similar view of a single coupler, showing the position of the valve closing the port when the coupler is uncoupled. Fig. 7 is a longitudinal section of an angle-cock when open. Fig. 8 is a side view of the double piston of the two-way closure-valve removed and showing one of the pistons in section. Fig. 9 is a side elevation of one of the movable collars of the piston-stem removed from the stem.

In the drawings, A and A' represent portions of car-sections of the main air-pipe of a train air-brake system located at the adjacent ends of two cars, (not shown,) and B a two-way coupling-section constructed in accordance with my invention connecting car-sections of the train-pipe.

The coupling B comprises the return-bends C, one at each end of the loop, each having a body portion 1, forming an extension of the main train-pipe sections A and A', respectively, to which they are suitably coupled, and the equal tubular branches 2 and 2', extending horizontal in opposite equal curves from the extension 1, the two-way closure-valves D, one coupled to each return-bend C and each having a cylindrical body portion 3, from which extend diametrically opposite in alinement near one end the tubular branches 4 and 5 and from near the opposite end the tubular branches 4' and 5', the nipples 6 and 6', respectively, coupling the branches 4 and 4' to the branches 2 and 2' of the return-bends C, the angle-cocks E, one coupled to each valve D and each having a cylindrical body portion 7, from which extend on one side in alinement with the branches 5 and 5' of the valve D the branches 8 and 8' and from the opposite side opposite to the branches 8 and 8', respectively, the downwardly-angled hose-nipples 9 and 9', the coupling-nipples 10 and 10', respectively, coupling the branches 8 and 8' of the angle-cocks with the branches 5 and 5' of the valve D, the pairs of hose-sections 11 and 11', coupled, respectively, to the nipples 9 and 9' of each of the angle-cocks E and suitably secured thereon by the band-clamps 12 and 12', and the pairs of complementary sections 13 and 13', respectively, of the couplers F, suitably secured to hose-sections 11 and 11' and adapted when coupled to complete the coupling B. The loop B thus constructed and coupled forms a continuous two-way connection between the car-sections A and A', which is controlled by the angle-cocks E, the valves D, and the couplers F, as hereinafter described.

The bore 14 of the cylinder 3 of the valve D is enlarged at each end of the cylinder, and the enlarged portions are internally threaded to receive the screw-plugs 15 and to form shoulders 16, and within the cylinder 3 at each end is inserted the equal inner cylinders 17 and 17', each having one end closed by a head 18 of increased diameter, forming a flange which abuts a shoulder 16 and limits the distance of insertion of the inner cylinders, which are each about one-third the length of the bore 14 of the cylinder 3, and when in position in the cylinder 3 the inner ends of the cylinders 17 and 17' form shoulders 19. The cylinders 17 and 17' are respectively provided with the ports 20 and 20', which respectively register with the bores of the branches 4 and 5 and 4' and 5' of the cylinder 3, and in the respective bores of the cylinders 17 and 17' are the movable piston-valves 21 and 21', which are of equal length and diameter and are connected by the common stem 22. The piston 21 is adapted to close the ports 20 and the piston 21' the ports 20'. Upon the stem 22 are movably mounted the disk-collars 23 and 23', each having diameters greater than the pistons and slightly less than the bore 14 of the cylinder 3, and between the collars the coil-spring 24, which normally holds the collars against the inner ends of the respective pistons 21 and 21'. Thus mounted one of the inner cylinders is removed, and the pistons are inserted into the bore 14 of the outer cylinder 3 until the forward piston is wholly within the other inner cylinder. The removed inner cylinder is then reinserted until its head 18 is against a shoulder 16, with the ports of the cylinder in register with the bores of the adjacent branches. In this position the disk-collars are held by the spring 24 against the inner ends 19 of the inner cylinders, the length of the stem being such that the outer ends of the pistons are in line with the inner edge of the ports 20 and 20', in which position it is apparent that if either one of the pistons is pushed inward the forward piston moves away from its companion collar, which is held stationary by the abutting shoulder 19, the stem moving through the collar, while the rearward piston carries with it the collar abutting it, thereby compressing the spring 24 between the moving collar and the stationary collar, and that when the rearward piston is released the spring will return the pistons and the collars to their normal position. It is further manifest that if either one of the pistons is pushed outward to contact with a head 18 that it will close the adjacent ports 20 or 20', and thereby close communication between the branches 4 and 5 or 4' and 5', according to the direction of movement, and that the valve so constructed will be operated with equal facility in either direction by any pressure that is applied in the direction of movement that is sufficient to overcome the resistance of the spring 24 and the friction of the movable parts, that if equal pressures are applied to the outer ends of the pistons they will remain in the normal position in which they are held by the spring, uncovering all the ports, and that if the pressures on the outer ends of the pistons are unequal and the difference in pressure is sufficient to overcome the resistance of the spring and the friction the pistons will move in the direction to close the ports adjacent to the piston having the least pressure.

The bodies 7 of the angle-cocks E are each provided with a tapered bore 25, in which is rotatably fitted a tapered plug 26, the smaller end portion 27 of which projects beyond the end of the body 7 and is further reduced in diameter, and upon this reduced portion 27 there is fixed a handle 28, by which the plug 26 is turned. The plug is provided with diametric bores forming the ports 29 and 29', which are located in the same radial plane of the plug and respectively in the vertical planes of the branches 8 and 9 and 8' and 9', and the handle 28 is fixed to the plug in such relative position to the ports 29 and 29' that when the handle is in a horizontal position, as shown in Fig. 1, the ports 29 and 29' are in register with the bores of the oppositely-extending tubular branches 8 and 9 and 8' and 9', respectively, and form direct connections between said opposite branches and when the handle is in vertical position, as shown in Fig. 2, the ports are out of register with the branches and communication between the opposite branches is cut off.

At the end opposite the handle 28 the body 7 of each of the angle-cocks E is provided with a cylindrical enlargement of the bore 25, and the wall around the enlargement is internally threaded to receive the screw-plug 30, which is provided with a bore to receive the coil-spring 31, which when the plug is run into the threaded end of the body 7 compresses the spring 31 on the tapered plug 26, whereby any wear of the plug is automatically taken up.

The complementary sections 13 and 13' of the hose-couplers F are as to their body portions 32, having the complementary compression-flanges 33, the coinciding faces 34, the grooved ports 35, provided with the rubber gaskets 36, substantially of the same general form as those in common and general use in car air-brake systems; but as used in my improved two-way coupling-section and for the purpose of rendering it more effective in accomplishing the objects of my invention I have so modified the usual construction as to provide each coupler-section opposite the port 35 in the body 32 a bore 37, through which is introduced the valve-disk 38, adapted to close the port 35. Projecting centrally from the outer face of the valve through the port is the tongue 39 and opposite thereto from the inner face of the valve projects the stem 40, having the central bore 41. The bore 37 extends through the back of the coupler-body, forming an opening into the inner cavity, and around the bore the body is internally threaded to receive a hollow screw-closure plug 42, which is provided with a central stem 43, adapted to enter the bore of the valve-stem and form a guide for its movement. Around the stems and between the valve and the screw-plug is mounted a coil-spring 44, which when the screw-plug is run into position closing the opening 37 holds the valve 38 normally seated on the rubber gasket and closing the port 35. Each complementary section 13 and 13' of the couplers F being so equipped when the two sections are brought face to face for coupling the oppositely-projecting tongues 39 meet end to end, and as the sections are pressed into face-to-face contact the valves 38 are pressed back to contact with the inner rim of the screw-plug 42, which also forms a seat for the valve, as shown in Fig. 5. When the sections have been coupled in the usual way, the valves 38 are thereby firmly held by the mutual contact of their tongues in position fully opening the ports 35 and leaving free passage for air through the ports. The valve 38 of each coupler-section is also provided with one or more small leakage-ports 46, which when the valve is in the open position shown in Fig. 5 serve to equalize the pressure on each face of the valve and when in a closed position, as shown in Fig. 6, are sufficient to effect the equivalent of a graduated service reduction of the pressure in the train-pipe by the engineer's valve.

I am aware that theoretically it is not broadly new to employ a valve having a service-leak for closing the ports of the coupler-sections when uncoupled; but, so far as I am aware, the valves devised for such purpose are dependent after the sections are coupled on the admission of pressure through the leakage-ports between the valves for opening them against the pressure of a spring employed to hold the valve normally closed; but manifestly valves so constructed and dependent on such leakage for opening are obstructive of the prompt distribution and equalization of pressures throughout a train brake system, and if effective to close the ports of the coupling-sections when the sections are accidentally uncoupled without any serious loss of pressure they will be equally effective to prevent an emergency reduction by the engineer's valve. By providing each coupler-section with a valve constructed as herein described and shown and which is automatically and mechanically opened and locked in an open position by the manual operation of coupling the sections and which is also automatically and mechanically closed by a spring under conditions of equal air-pressure on all parts of the valve, whether normal atmospheric or artificially increased, I secure a free and unobstructed passage of the air through the train-pipe so long as the sections remain coupled, and in the event of their accidental uncoupling I also secure a prompt closure of the ports of the couplers by the valves under the wholly free and unresisted action of their springs.

Premising a train air-pipe equipped with two-way coupling-sections constructed in accordance with my invention, with the angle-cocks in open position, as shown in Fig. 1, it is manifest that there is established a continuous pipe connection between the air-pump and reservoir on the engine and the auxiliary reservoirs of the cars, having two equal passage-ways between the cars both continuous with the main line and normally free and unobstructed by the two-way closure-valves D, which are normally held open by their springs or by the coupler-valves 38, which are automatically locked in an open position by the operation of coupling the coupler-sections. It is further manifest that this condition will be wholly undisturbed by the introduction or the reduction of a working pressure of air for the brakes throughout the system, as the pressure on the pistons of the valves D being exactly balanced will remain open, and the valves of the couplers being locked in an open position will so remain whatever the conditions of pressure so long as the couplers remain coupled, and so long as the system remains intact it will be effective for each and all of the operations ordinarily effected by it. If, however, a hose bursts in any coupler-section—as, for illustration, either one of hose-sections 11'—there is an immediate reduction of pressure on the piston 21' of each valve D of the section, which by reason of the greater pressure on the pistons 21 will cause the movement of the pistons of both valves of the section across the ports 20', thereby causing the instantaneous closing of those ports, by which any considerable reduction of the pressure in the train-pipe is prevented and there still remains a wholly free unobstructed and continuous pipe connection from the brake-controlling mechanism on the engine to the brake mechanism on the cars sufficient for all the operations of the system, and that would be true if a similar accident should occur at each coupling-section of the system. In like manner and for like reasons the ports 20 would be closed if a hose-pipe 11 instead of hose-pipe 11' should burst, and it is manifest that only by the bursting of both a hose 11 and 11' in the same coupling-section can a reduction of pressure equivalent to an emergency reduction occur from such accidental cause. While such occurrence is possible, its probability is remote, and it will therefore readily be seen that by the use of my invention the liability of serious accidents to trains from the bursting of hose-sections of the train-pipe is diminished many fold. This liability is still further diminished by providing the pistons 21 and 21' each with a leakage-port 47 of sufficient capacity to produce a gradual stop of the train in the event of the bursting of a hose, as such stoppage would not only advise the engineer of the cause, but gives opportunity for repair of the injured coupling. The other common cause of serious accident to trains which my invention is designed to prevent is the reduction of air-pressure caused by the uncoupling of the hose-couplers when a train breaks in two parts. Disastrous and destructive wrecks from this cause occur most frequently to long and heavy freight-trains which often include cars at the rear end of the train which are not supplied with air-brakes. The sudden setting of all the brakes in the system produced by the sudden and complete loss of pressure in the train-pipe brings the front part of the train to a quick stop, while the rear section having cars without brake control is carried on by the momentum of such cars to disastrous collision with the front section. When such uncoupling occurs with my coupler-section, the valves 38 are released and the springs 44 operate them to quickly close the ports 35 and prevent any appreciable reduction of pressure except by leakage through the leakage-ports 46, which produces such gradual setting of the brakes that the whole train is brought to a gradual stop. It is manifest also that by the use of these valves the front part of the train is still under the control of the engineer who can supply air to the train-pipe of the front section of the train equal to the leakage, and thus keep it from being overtaken by the separated rear section. It is further apparent that the use of my coupler-section will not interfere with an emergency application of the brakes by the engineer whenever circumstances require resort to it, since the reduction of pressure required for such application has and can have no tendency to disturb the equilibrium of pressure on the pistons of the valves D, nor can such reduction effect a closure of the coupler-valves which are locked in open position while the coupler-sections remain coupled.

From the foregoing it will be seen that I have produced a coupling-section for air-brake pipes which if substituted for the coupling-sections in general use will be equally as efficient and in addition will, except in remotely possible contingencies, prevent any injurious and dangerous results from the disruption to which any form of coupling is liable by reason of its location and the requirements of its construction as regards material and facility of connection.

The principle of construction of my invention of a two-way section having two-way closure-valves if extended to other parts or the whole line of air-brake pipes or to other pipes for fluid under high pressure will greatly increase the factor of safety without reducing efficiency, and I therefore do not limit myself to the application of the principle to coupling-sections of air-brake pipes alone.

What I claim to be new is—

1. In a section for fluid-pressure pipes, the combination with two conduits arranged side by side, and having common connections, connecting the conduits with each other at each end, and adapted to connect the conjoined conduits as a two-way section in a main pipe-line, of a pair of pressure-actuated two-way closure-valves, one adjacent to each connection, each of said valves having opposite equal pressure areas, one for each conduit and normally open thereto, said valves being adapted to be conjointly actuated to shut off either of the conduits from the other of them and from the main line by a preponderance of pressure in the other and in the line, and means to return each valve to its normal position when the pressure is equalized in the conduits.

2. The combination with a main air-pipe of a train air-brake system, of a two-way coupling-section for disconnected parts thereof, comprising a pair of conduits arranged side by side and having a common coupling connection at each end adapted to couple the section into and make each conduit of the section thus formed continuous with the main air-pipe and a part thereof, and a pair of two-way closure-valves common to the two conduits, adapted to close the connections of either conduit with the main pipe and with the other conduit, said valves being normally open and adapted to be held normally open by equal air-pressure in the conduits and to be operated by unequal pressures therein, to close the connections of the conduit having the least pressure, and means to return each valve to its normal position when the pressure in the conduits is equalized.

3. A two-way closure-valve comprising a cylinder closed at each end and having a central portion of its bore of increased diameter forming inner shoulders, and opposite side ports in each end portion, pipe connections extending oppositely from the ports, a piston in each end portion of the cylinder adapted to close its ports, the pistons being of equal end area, a stem connecting the inner ends of the pistons, and having a length equal to the distance between the inner shoulders of the cylinder, and the combined length of the pistons and the stem being less than the distance from the centers of the ports of one end portion to the centers of the ports of the other end portion of the cylinder, a pair of disk-collars movably mounted on the stem, and having diameters adapting them to engage the shoulders, and a helical spring mounted on the stem between the disks, the spring being adapted to normally hold the disks in engagement with the shoulders and the inner ends of the pistons, and to yield to permit movement of the pistons to close the ports of either end portion according as the pressure in the pipe connections of one end portion of the cylinder exceeds the pressure in the pipe connections of the other end portion, substantially as set forth.

4. In a coupling-section for air-brake pipes a pair of pipes arranged side by side, each pipe of the pair having a pair of flexible hose-sections each provided with a coupler complementary to the other and adapted to connect and disconnect the hose-sections; return-bends connecting the pipes at each end with each other and adapted to connect the conjoined pipes as a two-way section of a main-line air-brake pipe, a pressure two-way closure-valve common to both pipes between the hose-sections and each return-bend, said valve being normally open as to each pipe, and adapted to be conjointly actuated by a difference in air-pressure of the two pipes to shut off either of the two pipes having the lesser pressure from the main line and its companion pipe, and means to return each valve to its normal position when the pressure in the pipes is equalized.

5. In a coupling-section for air-brake pipes a pair of pipes arranged side by side, each pipe of the pair having a pair of flexible hose-sections each provided with a coupler complementary to the other and adapted to connect and disconnect the hose-sections; return-bends connecting the pipes at each end with each other and adapted to connect the conjoined pipes as a two-way section of a main-line air-brake pipe, a pressure two-way closure-valve common to both pipes between the hose-sections and each return-bend, said valves being normally open as to each pipe, and adapted to be conjointly actuated by a difference in air-pressure of the two pipes to shut off either of the two pipes having the lesser pressure from the main line and its companion pipe springs adapted to return the valves to normal open position when the pressure in the pipes is equalized, a closure-valve for each complementary coupler-section adapted to be automatically and mechanically opened and locked in open position by the manual operation of coupling the couplers, and to be automatically and mechanically closed by the uncoupling of the coupler-sections, and a leakage-port in each coupler-valve, substantially as set forth.

6. The combination with a fluid-pressure system of a two-way closure-valve comprising a main cylinder, end cylinders of reduced diameters and equal bores secured in end portions of the main cylinder, heads closing the outer ends of the end cylinders, a piston in each end cylinder, a common stem for the pistons rigidly connecting their inner ends, a pair of disk-collars movably mounted on the stem, a helical spring mounted on the stem between the collars and normally compressing the collars oppositely against the inner ends of the pistons and the end cylinders, opposite side ports in the end cylinders between the heads and the outer ends of the pistons, adapted to be closed by the pistons, and branch pipes extending oppositely from the ports of each cylinder adapted to connect the valve into line with two lines of pipe, the piston of the valve being adapted to be operated to close either line by a preponderance of pressure in the other.

7. The combination with a main fluid-pressure pipe, of a pair of branch pipes having a common connection with the main pipe, a cylinder transverse and cross-connecting the branch pipes and having opposite ports registering with each branch pipe, a piston-valve movable in the cylinder, having opposite end portions with equal end areas, and adapted to move in either direction and close the ports of the branch pipe in the direction of the movement, a spring adapted to hold the valve normally in, and return it to, position uncovering all the ports, when the pressure in the branch pipes is equal, and to yield in the direction of movement of the valve when actuated by a preponderance of pressure in either branch to close the ports of the other.

In testimony whereof I have hereunto set my hand this 10th day of August, 1904.

WILLIAM J. HOFSTATTER.

Witnesses:
V. W. MOREHOUSE,
BESSIE I. MAWER.